(12) United States Patent
Isoda

(10) Patent No.: US 6,875,990 B2
(45) Date of Patent: Apr. 5, 2005

(54) RADIATION IMAGE STORAGE PANEL

(75) Inventor: Yuji Isoda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 82 days.

(21) Appl. No.: 10/191,811

(22) Filed: Jul. 10, 2002

(65) Prior Publication Data

US 2003/0042429 A1 Mar. 6, 2003

(30) Foreign Application Priority Data

Jul. 10, 2001 (JP) .................................. 2001-209592

(51) Int. Cl.[7] .............................................. G03B 42/08
(52) U.S. Cl. ................................ 250/473.1; 250/484.4
(58) Field of Search ........................ 250/484.2, 483.1, 250/486.1, 484.4, 473.1

(56) References Cited

U.S. PATENT DOCUMENTS

| | | | | |
|---|---|---|---|---|
| 5,021,671 A | * | 6/1991 | Kohda | ....................... 250/484.4 |
| 5,055,681 A | * | 10/1991 | Tsuchino et al. | ........... 250/585 |
| 5,098,813 A | | 3/1992 | Nakano et al. | |
| 2001/0007352 A1 | * | 7/2001 | Hell et al. | ................ 250/484.4 |
| 2002/0041977 A1 | * | 4/2002 | Iwabuchi et al. | ............ 428/690 |

FOREIGN PATENT DOCUMENTS

| | | |
|---|---|---|
| EP | 0 175 578 A2 | 3/1986 |
| JP | 62-47599 A | 3/1987 |

OTHER PUBLICATIONS

Japanese Abstract No. 62047600, dated Mar. 2, 1987.

* cited by examiner

*Primary Examiner*—Albert Gagliardi
(74) *Attorney, Agent, or Firm*—Sughrue Mion, PLLC

(57) ABSTRACT

A radiation image storage panel composed of a substrate and a phosphor film of a stimulable phosphor which is composed of a mother component and an activator element and is formed by vapor deposition, is preferred to have a relationship of a molar ratio of activator element/mother component in an optionally determined one position on the phosphor film and a molar ratio of activator element/mother component in an optionally determined different position on the phosphor film satisfies the condition of $0.1 \leq Ra/Rb \leq 10$ [Ra means a molar ratio of activator element/mother component in an optionally determined one position of the phosphor film and Rb means a molar ratio of activator element/mother component in an optionally determined different position of the phosphor film].

4 Claims, 1 Drawing Sheet

RADIATION IMAGE STORAGE PANEL

FIELD OF THE INVENTION

The present invention relates to a radiation image storage panel favorably employable in a radiation image recording and reproducing method utilizing-stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is epposed to electromagnetic wave such as visible light or infrared rays (i.e., stimulating light).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light to emit stimulated light; and photoelectrically detecting the emitted light to obtain electric signals giving a visible radiation image. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as stimulable phosphor sheet) has a basic structure comprising a substrate and a stimulable phosphor layer provided thereon.

The phosphor layer is generally formed by coating a dispersion of phosphor particles in a binder solution on the substrate and drying the coated dispersion on the substrate, and therefore comprises a binder and phosphor particles dispersed therein.

It is desired that radiation image storage panels used in these methods have sensitivity as high as possible.

It is known that a radiation image storage panel having on a substrate a stimulable phosphor film prepared by vapor deposition (or vapor-accumulating method) such as vacuum vapor deposition or sputtering gives a reproduced radiation image with high sensitivity as well as high sharpness.

Japanese Patent Provisional Publication No. 62-47600 discloses a method in which a stimulable phosphor film of a radiation image storage panel is formed by electron beam evaporation (which is a kind of vapor deposition method). In the method, an electron beam generated by an electron gun is applied onto a stimulable phosphor or its starting materials (i.e., evaporation source) to heat and vaporize the source, to deposit the vapor to form a phosphor film on the surface of the substrate. Thus formed phosphor film consists essentially of prismatic crystals of the stimulable phosphor. In the phosphor film, there are cracks among the prismatic crystals of the stimulable phosphor. For this reason, the stimulating rays are efficiently applied to the phosphor and the stimulated emission are also efficiently taken out. Hence, a radiation image of high sharpness can be obtained with high sensitivity.

Japanese Patent Publication No. 6-77079 describes a radiation image storage panel in which a stimulable phosphor film is formed by vapor deposition to have a fine block structure. A wide variety of stimulable phosphors are described in the publication as phosphors employable in the storage panel. However, only a thallium activated rubidium bromide phosphor is mentioned in detail in the publication.

Japanese Patent Publication No. 6-100679 describes a radiation image storage panel comprising a phosphor film of thallium activated rubidium halide which is prepared by heating plural evaporation sources with controlling evaporation rates of these evaporation sources, Japanese Patent Publication No. 7-84588 describes a radiation image storage panel having a stimulable phosphor layer using an alkali metal (Rb or Cs) halide phosphor. In the publication, the phosphor film is produced by coating a phosphor-binder dispersion on a support. The alkali metal halide is defined to contain an activator element of not more than 20 atomic %.

Japanese Patent Publication No. 5-32945 describes an apparatus for a radiation image-reproducing process comprising the steps of exposing a radiation image storage panel to stimulating rays having emitted from a light source (e.g., a fluorescent lamp) through a slit for linearly stimulating the storage panel (i.e., line stimulation), and detecting the stimulated emission having emitted from the storage panel by a line sensor comprising many photoelectric converting elements (i.e., line detection). The line sensor is placed so that it can face the storage panel in the area exposed to the stimulating rays on the exposed side or its back side.

SUMMARY OF THE INVENTION

The present invention has an object to provide a radiation image storage panel which shows specifically high sensitivity.

The present inventor has studied a vapor deposited film of a stimulable phosphor, particularly, a deposited stimulable europium activated cesium bromide phosphor film, to find out the conditions under which stimulated emission is produced with high lace. As a result, the inventor has discovered that the stimulable phosphor film shows increased high sensitivity when the activator element and the mother component of the stimulable phosphor are contained uniformly in the phosphor film.

Accordingly, the present invention resides in a radiation image storage panel comprising a substrate and a phosphor film of a stimulable phosphor which comprises a mother component and an activator element and is formed by vapor deposition, wherein a relationship of a molar ratio of activator element/mother component in an optionally determined one position on the phosphor film and a molar ratio of activator element/mother component in an optionally determined different position on the phosphor film satisfies the following condition:

$$0.1 \leq Ra/Rb \leq 10$$

in which Ra means the molar ratio of activator element/mother component in an optionally determined one position of the phosphor film and Rb means the molar ratio of activator element/mother component in an optionally determined different position of the phosphor film.

It is preferred that Ra/Rb satisfies the condition of $0.5 \leq Ra/Rb \leq 2.0$, more preferably $0.8 \leq Ra/Rb \leq 1.2$, most preferably $0.9 \leq Ra/Rb \leq 1.1$.

The radiation image storage panel of the invention preferably has a relationship of a molar ratio of activator element/mother component in an optionally determined one position on a surface of the phosphor film and a molar ratio of activator element/mother component in a corresponding position on a bottom face of the phosphor film satisfies the following condition:

$$0.1 \leq Rc/Rd \leq 10$$

in which Rc means a molar ratio of activator element/mother component in an optionally determined one position on a surface of the phosphor film and Rd means a molar ratio of activator element/mother component in a corresponding position on a bottom face of the phosphor film.

In the above-mentioned radiation image storage panel, the molar ratio of activator element/mother component in an optionally determined one position on a surface of the phosphor film is measured in a portion of from the upper surface to $1/10$ of the depth of the phosphor layer. The a molar ratio of activator element/mother component in a corresponding position on a bottom face of the phosphor film is measured in a portion of from the $9/10$ of the depth of the phosphor layer to the bottom face in contact with the substrate.

It is preferred that the ratio of Rc/Rd satisfies the condition of $0.5 \leq Rc/Rd \leq 2.0$, more preferably $0.8 \leq Rc/Rd \leq 1.2$, most preferably $0.9 \leq Rc/Rd \leq 1.1$.

The stimulable phosphor forming the phosphor layer of the radiation image storage panel of the invention preferably comprises an europium activated alkali metal halide phosphor having the formula (I):

$$M^{I}X \cdot aM^{II}X'_{2} \cdot bM^{III}X''_{3}:zEu \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X'' independently is at least one halogen selected from the group consisting of F, Cl, Br and I; and a, b, c and z are numbers satisfying the conditions of $0 \leq a < 0.5$, $0 \leq b < 0.5$ and $0 < z < 0.5$, respectively.

The stimulable phosphor preferably comprises europium activated cesium bromide.

The invention further resides in a method for preparing a radiation image storage panel of the invention, particularly employing an europium activated alkali metal halide phosphor of the formula (I), by vaporizing one or more vaporization sources comprising a mother component and one or more vaporization sources comprising an europium element under such condition that the vaporization of the mother component sources is controlled independent of the vaporization of the europium element sources, to form a phosphor film on a substrate.

The above-mentioned method, it is preferred that the vaporization is performed by applying an electron beam continuously or intermittently to the vaporization sources under control of energy applied to the vaporization sources.

The invention furthermore resides in a method for preparing a radiation image storage panel of the invention, particularly employing an europium activated alkali metal halide phosphor of the formula (I), by vaporizing one or more vaporization sources comprising a mother component and an europium element, under such condition that the concentration of the mother component and europium element varies in a direction of depth of the vaporization source.

In the above-mentioned method, it is preferred that the vaporization is performed by applying an electron beam continuously or intermittently to the vaporization sources under control of energy applied to the vaporization sources.

In the above-mentioned methods, it is preferred that the europium element sources comprise europium compounds comprising a divalent europium compound of 70 mol. % or more, based on the total amount of an europium compounds in the sources, that the europium compounds are expressed by $EuBr_{x}$ in which x satisfies the condition of $2.0 \leq x \leq 2.3$, and that the europium compound is heated to 100–800° C. prior to the vaporization.

DETAILED DESCRIPTION OF THE INVENTION

The preparation of a radiation image storage panel of the invention is described below by referring to the case of employing the stimulable europium activated cesium bromide phosphor.

The radiation image storage panel comprises a substrate and a phosphor film deposited on the substrate. The substrate can be selected from those employed in the conventional radiation image storage panels. The substrate preferably are sheets of quartz glass, metals (e.g., aluminum, iron, tin, chromium) or heat-resistant resins (e.g., aramide).

On the substrate, the phosphor film is deposited. The phosphor film is preferably formed by electron beam deposition which employs electron beam to heat the evaporation source. The electron beam evaporation gives regularly aligned prismatic crystals having good shape.

For the preparation of the phosphor film of the radiation image storage panel of the invention, it is preferred to employ two or more vaporization sources such as a vaporization source comprising a mother component and a vaporization source comprising an activator element for the vaporization procedure. Plural vaporization sources comprising a mother component can be employed In the vaporization procedure. Plural vaporization sources comprising an activator element can be employed in the vaporization procedure.

Figure 1:
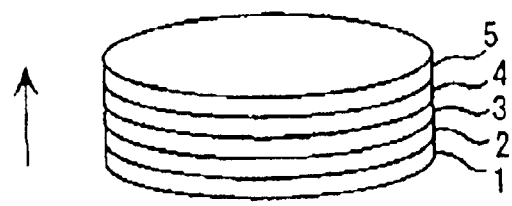
FIG. 1 indicates an element of a vaporization source (tablet) favorably employable for preparing a radiation image storage panel of the invention.
Figure 2:
FIG. 2 indicates a different example of a vaporization source (tablet) favorably example for preparing a radiation image storage panel of the invention.
Figure 3:
FIG. 3 indicates a different example of a vaporization source (tablet) favorably employable for preparing a radiation image storage panel of the invention.

Alternatively, a phosphor source layer comprising a mother component and a phosphor source layer comprising an activator element can be confined to form a vaporization source in the form of a tablet such as that illustrated in the attached FIGS. 1 to 3.

The tablet of FIG. 1 consists of five phosphor source layers 1, 2, 3, 4 and 5. The phosphor source layers comprise a mother component and an activator element in different concentrations. In more detail, the top layer 5 contains the activator element in the highest concentration, the next layer 4 contains the activator element in an amount less than that in the layer 5. The bottom layer contains the activator element in the lowest concentration. Thus, the upper layers contain the activator element in a relatively high concentration.

The tablet of FIG. 2 consists of two phosphor source layers 6 and 7, in which the bottom layer 6 comprises a mother component and the top layer 7 comprises an activator element.

The tablet of FIG. 3 consists of two phosphor source layers 8 and 9, in which both of the bottom layer 8 and the top layer 9 comprise a mother component and an activator element. The content of the activator element in the bottom layer 8 is less than that in the top layer 9.

A variety of variations (e.g., number of layer, concentration of materials) of the tablet can be employed.

Also employable in the vaporization procedure is that a combination of one or more tablets comprising a mother component and one or more of tablets comprising an activator element. For instance, one or more tablets comprising a mother component and one or more of tablets comprising an activator element are placed in a vaporization apparatus separately from each other. To each tablet is applied an electron beam. The energy of each electron beam is independently controlled with monitoring the amounts of the deposited mother component and activator element. In the vaporization procedure, a substrate is rotated around the normal axis and further is moved to form a circle above the vaporization sources.

Generally, the europium compound comprises a divalent europium ($Eu^{2+}$) compound and a trivalent ($EU^{3+}$) compound. It is preferred that the europium compound contains the divalent europium compound as much as possible, at least 70%.

The evaporation source preferably is in the form of a tablet having a relative density of 80% to 90%. The tablet can be produced at 50 to 200° C. under pressure 800 to 1,000 $kg/cm^2$. Thus produced tablet can be subjected to degassing treatment.

The vapor deposition can be performed in a commercially available vapor deposition apparatus according to the known procedure.

In the vapor deposition apparatus, the evaporation sources and a substrate on which the phosphor film is to be deposited are set. The apparatus is then evacuated to give an inner pressure of $1\times10^{-5}$ to $1\times10^{-2}$ Pa. An inert gas such as Ar gas or Ne gas may be incorporated into the apparatus. The substrate is placed perpendicularly to the direction in which the vapor comes out of the source.

In the vapor deposition apparatus, an electron beam generated by an electron gun is applied onto the vapor source. The accelerating voltage of electron beam preferably is in the range of 1.5 kV to 5.0 kV.

By applying the electron beam, the evaporation source is heated, vaporized, and deposited on the substrate. The deposition rate of the phosphor generally is in the range of 0.1 to 1,000 $\mu$m/min., preferably in the range of 1 to 100 $\mu$m/min. The electron beam may be applied twice or more to form two or more phosphor films. The substrate may be cooled or heated, if needed, during the deposition process, or may be subjected to heat treatment (annealing treatment) after the deposition process is complete.

The vapor deposition method used in the invention is not restricted to the electron beam-evaporating method, and various methods such as resistance-heating method and sputtering method can be used.

In the above-described manner, the phosphor film in which the prismatic stimulable phosphor crystals are aligned almost perpendicularly to the substrate is formed. Thus formed phosphor film comprises only the stimulable phosphor with no binder, and there are produced cracks extending the depth direction in the phosphor film.

The phosphor film preferably has a thickness of 100 $\mu$m to 1 mm, more preferably 200 to 700 $\mu$m.

The distribution of the content of the mother component and activator element in the phosphor film can be made by a cathode-luminescence method (CL), electron spectroscopy for chemical analysis (ESCA), an electron probe microanalyzer method (EPMA), or secondary ion massspectroscopy (SIMS). Alternatively, a portion of the phosphor film is collected and subjected to X-ray fluorescence analysis, atomic absorption spectroscopy, or inductively coupled plasma spectroscopy (ICP).

It is preferred to provide a transparent protective film on the surface of phosphor film, so as to ensure good handling of the radiation image storage panel in transportation and to avoid deterioration. The protective film is preferably transparent. Further, for protecting the storage panel from chemical deterioration and physical damage, the protective film must be chemically stable, physically strong, and of high moisture proof. A moisture permeability of the protective film (at 25° C.) preferably is not higher than 300 $g/m^2 \cdot 24$ hr·$\mu$m.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 $\mu$m (if the film is made of polymer material) or in the range of about 100 to 1,000 $\mu$m (if the film is made of inorganic material such as glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 $\mu$m. For forming the fluororesin layer, additives such as a crosslinking agent, a film-hardening agent and an anti-yellowing agent can be used. In particular, the crosslinking agent is advantageously employed to improve durability of the fluororesin layer.

Thus, the radiation image storage panel of the invention can be prepared. The storage panel of the invention may have known various structures. For example, in order to improve the sharpness of the resultant image, at least one of the films may be colored with a colorant which does not absorb the stimulated emission but the stimulating rays.

The process of the invention for reading radiation image information stored in the above-described radiation image storage panel is explained below by referring to the attached drawings.

The present invention is further described by the following examples.

EXAMPLES 1 to 10 AND COMPARISON EXAMPLES 5 to 7—TWO SOURCE-EVAPORATION (1) Preparation of Evaporation Source Five tablets of cesium bromide, in which each tablet was made of 100 g (0.47 mol.) of cesium bromide powder were produced. Independently, five tablets of an europium compound, in which each tablet was made of a powdery europium compound in the amount set forth in Table 1 were produced.

The tablets were produced by dehydrating and degassing the powder at 200° C. for 2 hours in an evacuated apparatus and compressing the powder at a pressure of 800 kg/cm².

Thus produced tablets were degassed at 150° C. for 2 hours in an evacuated apparatus.

(2) Formation of Phosphor Film

A quartz substrate was washed successively with an aqueous alkaline solution, purified water, and isopropyl alcohol, and then mounted within a vapor deposition apparatus. In the vapor deposition apparatus, one CsBr tablet and five europium compound tablets were placed in the predetermined sites of a revolving table. Subsequently, the apparatus was evacuated to reach $1 \times 10^{-3}$ Pa.

In the apparatus, the substrate was rotated around its normal axis and further was moved to form a circle above the vaporization sources.

In the apparatus, an electron beam from an electron gun (accelerating voltage: 4.0 kV) was applied onto the tablets alternately by revolving the table so as to deposit the stimulable CsBr:Eu phosphor on the substrate (heated to 200° C.) at a deposition rate of 15 $\mu$m/min.

After the deposition was complete, the inner pressure was returned to atmospheric pressure, and the substrate was taken out of the apparatus. On the substrate, a deposited film (thickness: approx. 450 $\mu$m) consisting of prismatic phosphor crystals (each crystal having the width of approx. 8 $\mu$m and the length of approx. 450 $\mu$m) aligned densely and perpendicularly was formed.

Thus, a radiation image storage panel of the invention having a substrate and a deposited phosphor layer was prepared.

TABLE 1

| Example No. | Europium Compound | x | Amount (g) | Molar Amount |
|---|---|---|---|---|
| Ex. 1 | EuBr$_x$ | 2.2 | 1.8354 | $5.60 \times 10^{-3}$ |
| Ex. 2 | EuBr$_x$ | 2.2 | 0.5506 | $1.68 \times 10^{-3}$ |
| Ex. 3 | EuBr$_x$ | 2.2 | 0.1835 | $5.60 \times 10^{-4}$ |
| Ex. 4 | EuBr$_x$ | 2.2 | 0.0551 | $1.68 \times 10^{-4}$ |
| Ex. 5 | EuBr$_x$ | 2.2 | 18.3543 | $5.60 \times 10^{-2}$ |
| Ex. 6 | EuBr$_x$ | 2.1 | 0.5372 | $1.68 \times 10^{-3}$ |
| Ex. 7 | EuBr$_x$ | 2.0 | 0.5238 | $1.68 \times 10^{-3}$ |
| Ex. 8 | Eu$_2$O$_3$ | — | 1.1825 | $3.36 \times 10^{-3}$ |
| Ex. 9 | EuF$_2$ | — | 0.3101 | $1.68 \times 10^{-3}$ |
| Ex. 10 | EuCl$_2$ | — | 0.3744 | $1.68 \times 10^{-3}$ |
| Com. Ex. 5 | EuF$_3$ | — | 0.3511 | $1.68 \times 10^{-3}$ |
| Com. Ex. 6 | EuCl$_3$ | — | 0.4340 | $1.68 \times 10^{-3}$ |
| Com. Ex. 7 | EuBr$_x$ | 2.6 | 0.6043 | $1.68 \times 10^{-3}$ |

EXAMPLE 11—ONE SOURCE-EVAPORTION (1) Preparation of Evaporation Source

A powder of CsBr (20 g, 0.09 mol.) and a powder of EuBr$_{2.2}$ in an amount set forth below were placed and stirred for mixing for 15 minutes in a vibrating apparatus.

1) 0.1114 g ($3.4 \times 10^{-4}$ mol.)
2) 0.5572 g ($1.7 \times 10^{-3}$ mol.)
3) 1.1144 g ($3.4 \times 10^{-3}$ mol.)
4) 1.6715 g ($5.1 \times 10^{-3}$ mol.)
5) 2.2287 g ($6.8 \times 10^{-3}$ mol.)

The powdery mixture was then heated in a nitrogen atmosphere to 525° C. for 2 hours for firing. The fired powder was dehydrated and degassed at 200° C. in an evacuated chamber. Each powdery mixture was divided into five portions, and each portion was compressed at a pressure of 800 kg/cm². Thus, five tablets were produced for each powder mixture. All tablets were subjected to degassing treatment at 150° C. for 2 hours in an evacuated chamber.

The five tablets, each containing CsBr and one of EuBr$_{2.2}$ of 1) to 5) were placed one on another to produce a multi-layered tablet in which a tablet corresponding to 1) was placed on the bottom and a tablet corresponding to 5) was placed on the top, in the form illustrated in the attached FIG. 1.

(2) Formation of Phosphor Film

The procedures of the aforementioned Examples were repeated except for employing the above-produced tablets, to deposit on a quartz substrate an europium activated cesium bromide phosphor film consisting of prismatic crystals (film thickness: approx. 450 $\mu$m). Thus, radiation image storage panels of the invention were prepared.

EXAMPLE 12—ONE SOURCE-EVAPORATION (1) Preparation of Evaporation Source

A powder of CsBr (20 g, 0.09 mol.) and a powder of Er$_{2.2}$ in an amount set forth below were placed and stirred for mixing for 15 minutes in a vibrating apparatus.

1) 0.1114 g ($3.4 \times 10^{-4}$ mol.)
2) 0.5572 g ($1.7 \times 10^{-3}$ mol.)
3) 1.1144 g ($3.4 \times 10^{-3}$ mol.)
4) 1.6715 g ($5.1 \times 10^{-3}$ mol.)
5) 2.2287 g ($6.8 \times 10^{-3}$ mol.)

The powdery mixture was then heated in a nitrogen atmosphere to 525° C. for 2 hours for firing. The fired powder was dehydrated and degassed at 200° C. in an evacuated chamber.

Each powdery mixture was divided into five portions. The divided portions, each containing CsBr and one of EuBr$_{2.2}$ of 1) to 5) were placed one on another to produce a multi-layered body in which a portion corresponding to 1) was placed on the bottom and a portion corresponding to 5) was placed on the top, in the form illustrated in the attached FIG. 1. The multi-layered body was then compressed at a pressure of 800 kg/cm² to produce five tablets. All tablets were then subjected to degassing treatment at 150° C. for 2 hours in an evacuated chamber.

(2) Formation of Phosphor Film

The procedures of the aforementioned Examples were repeated except for employing the above-produced tablets, to deposit on a quartz substrate an europium activated cesium bromide phosphor film consisting of prismatic crystals (film thickness: approx. 450 $\mu$m). Thus, radiation image storage panels of the invention were prepared.

COMPARISON EXAMPLES 1–4—ONE SOURCE-EVAPORATION (1) Preparation of Evaporation Source A powder of CsBr (100 g, 0.47 mol.) and a powder of the europium compound in an amount set forth in Table 2 were placed and stirred for mixing for 15 minutes in a vibrating apparatus.

TABLE 1

| Example No. | Europium Compound | x | Amount (g) | Molar Amount |
|---|---|---|---|---|
| Com. Ex. 1 | $EuBr_x$ | 2.2 | 1.8404 | $5.60 \times 10^{-3}$ |
| Com. Ex. 2 | $EuBr_x$ | 2.2 | 0.1840 | $5.60 \times 10^{-4}$ |
| Com. Ex. 3 | $EuBr_x$ | 2.2 | 18.4040 | $5.60 \times 10^{-2}$ |
| Com. Ex. 4 | $Eu_2O_3$ | — | 1.8404 | $5.20 \times 10^{-3}$ |

The powdery mixture was then heated in a nitrogen atmosphere to 525° C. for 2 hours for firing. The fired powder was dehydrated and degassed at 200° C. in an evacuated chamber. Each powdery mixture was divided into five portions, and each portion was compressed at a pressure of 800 kg/cm². Thus, five tablets were produced for each powder mixture. All tablets were subjected to degassing treatment at 150° C. for 2 hours in an evacuated chamber.

(2) Formation of Phosphor Film

The procedures of the aforementioned Examples were repeated except for employing the above-produced tablets, to deposit on a quartz substrate an europium activated cesium bromide phosphor film consisting of prismatic crystals (film thickness: approx. 450 μm). Thus, radiation image storage panels of the invention were prepared.

Evaluation of Radiation Image Storage Panel

The radiation image storage panels of Examples 1–12 and Comparison Examples 1–7 were examined in their sensitivities in the following manner:

X-rays emitted at a voltage 40 kVP and a current of 30 mA were applied to the radiation image storage panel. Subsequently, the storage panel was scanned with He—Ne laser beam, and the stimulated emission was detected by a photomultiplier. The sensitivity was evaluated from the luminance of the stimulated emission. The sensitivity is set forth in Table 3 in terms of relative value (sensitivity of the storage panel of Comparison Example 1 is set to 1).

Further, ratios of $Ra^1/Rb^1$, $Ra^2/Rb^2$, $Ra^3/Rb^3$, and $Ra^4/Rb^4$ each of which represents an average relationship of a molar ratio of Eu element/Cs element in the center position on the deposited phosphor film and a molar ratio of Eu element/Cs element in one position on the peripheral of the deposited phosphor film were determined by the below-mentioned methods.

Furthermore, ratios of $Rc^1/Rd^1$, $Rc^2/Rd^2$, $Rc^3/Rd^3$, and $Rc^4/Rd^4$ each of which represents an average relationship of a molar ratio of Eu element/Cs element in the surface portion on the deposited phosphor film and a molar ratio of Eu element/Cs element in the bottom portion of the deposited phosphor film were determined by the below-mentioned methods. The results of the determinations are set forth in Table 3.

(1) $Ra^1/Rb^1$—X-ray Fluorescence Analysis 0.1 g of phosphor is collected from the predetermined site of the phosphor film and pulverized to give a phosphor powder. The phosphor powder is placed in a holder, and each of signal from Cs element and signal from Eu element is measured. Separately, a calibration curve is prepared using mixtures of CsBr and $Eu_2O_3$ of different ratios. The desired $Ra^1$ and $Rb^1$ are determined using the calibration curve. The signal of Cs element is detected using Cs-La line, and the signal of Eu element is detected using Eu-La line.

(2) $Ra^2/Rb^2$—ICP Method 0.1 g of phosphor is collected from the predetermined site of the phosphor film and pulverized to give a phosphor powder. The phosphor powder is dissolved in a weak aqueous nitric acid solution, and subjected to measurement according to ICP method. Separately, a calibration curve is prepared using CsBr-containing aqueous nitric acid solutions in which different amounts of $EuBr_2$ are dissolved, The desired $Ra^2$ and $Rb^2$ are determined using the calibration curve.

(3) $Ra^3/Rb^3$—D-SINS Method

The phosphor film is cut. In the predetermined two positions on the cut surface, Cs signal and Eu signal are detected from the portion of 50 μm×50 μm×10 μm (depth). From the detected signals, the desired $Ra^3$ and $Rb^3$ are determined.

(4) $Ra^4/Rb^4$—CL Method

The phosphor film is cut. In the predetermined two positions on the cut surface, an emission signal from $Eu^{2+}$ (at 25 kV, 400–470 nm) is detected from the portion of 100 μm×100 μm×2 μm (depth). From the detected signals, the desired $Ra^4$ and $Rb^4$ are determined.

(5) $Rc^1/Rd^1$—X-ray Fluorescence Analysis

The phosphor film is separated from the substrate. The X-ray fluorescence analysis is made on the surface side and the bottom side in the portion of 10 μm×10 μm×30 μm (depth). From the detected signals, the desired $Rc^1$ and $Rd^1$ are determined.

(6) $Rc^2/Rd^2$—ICP Method

The phosphor film is separated from the substrate. Each of the surface and bottom of the separated phosphor film is etched up to 1/10 of the film depth using a weak nitric acid. The phosphor solution obtained by the etching is subjected to ICP measurement. The desired $Rc^2$ and $Rd^2$ are determined using a separately prepared calibration curve.

(7) $Rc^3/Rd^3$—D-SIMS Method

The phosphor film is separated from the substrate and cut. In the predetermined two positions on the cut surface, Cs signal and Eu signal are detected from the portion of 50 μm×50 μm×1/10 of depth). From the detected signals, the desired $Rc^3$ and $Rd^3$ are determined.

(8) $Rc^4/Rd^4$—CL Method

The phosphor film is separated from the substrate and cut. In the predetermined two positions on the cut surface, an emission signal from $Eu^{2+}$ (at 25 kV, 400–470 nm) is detected from the portion of 100 μm×100 μm×1/10 of depth). From the detected signals, the desired $Rc^4$ and $Rd^4$ are determined.

TABLE 3

Example 1 Sensitivity: 25

$Ra^1/Rb^1$: 1.9, $Ra^2/Rb^2$: 2.3, $Ra^3/Rb^3$: 3.2, $Ra^4/Rb^4$: 2.8
$Rc^1/Rd^1$: 1.8, $Rc^2/Rd^2$: 2.1, $Rc^3/Rd^3$: 3.1, $Rc^4/Rd^4$: 1.2

Example 2 Sensitivity: 80

$Ra^1/Rb^1$: 1.2, $Ra^2/Rb^2$: 1.2, $Ra^3/Rb^3/Rb3$: 1.3, $Ra^4/Rb^4$: 1.4
$Rc^1/Rd^1$: 1.2, $Rc^2/Rd^2$: 1.3, $Rc^3/Rd^3$: 1.2, $Rc^4/Rd^4$: 1

Example 3 Sensitivity: 40

$Ra^1/Rb^1$: 2.1, $Ra^2/Rb^2$: 1.9, $Ra^3/Rb^3$: 3.1, $Ra^4/Rb^4$: 2.5
$Rc^1/Rd^1$: 2.9, $Rc^2/Rd^2$: 2.9, $Rc^3/Rd^3$: 3.7, $Rc^4/Rd^4$: 1.9

Example 4 Sensitivity: 3.5

$Ra^1/Rb^1$: 8.8, $Ra^2/Rb^2$: 9.1, $Ra^3/Rb^3$: 7.8, $Ra^4/Rb^4$: 8.1
$Rc^1/Rd^1$: 8.9, $Rc^2/Rd^2$: 9.3, $Rc^3/Rd^3$: 6.1, $Rc^4/Rd^4$: 7.1

Example 5 Sensitivity: 30

$Ra^1/Rb^1$: 0.11, $Ra^2/Rb^2$: 0.21, $Ra^3/Rb^3$: 0.12, $Ra^4/Rb^4$: 0.15
$Rc^1/Rd^1$: 9.3, $Rc^2/Rd^2$: 9.9, $Rc^3/Rd^3$: 7.7, $Rc^4/Rd^4$: 6.5

Example 6 Sensitivity: 88

$Ra^1/Rb^1$: 1.1, $Ra^2/Rb^2$: 1.01 $Ra^3/Rb^3$: 1.3, $Ra^4/Rb^4$: 1.1
$Rc^1/Rd^1$: 1, $Rc^2/Rd^2$: 1.2, $Rc^3/Rd^3$: 1.9, $Rc^4/Rd^4$: 1.7

TABLE 3-continued

Example 7 Sensitivity: 97

$Ra^1/Rb^1$: 1.0, $Ra^2/Rb^2$: 1.1, $Ra^3/Rb^3$: 1.1, $Ra^4/Rb^4$: 1.1
$Rc^1/Rd^1$: 1.1, $Rc^2/Rd^2$: 1.5, $Rc^3/Rd^3$: 1.1, $Rc^4/Rd^4$: 1.3

Example 8 Sensitivity: 1.1

$Ra^1/Rb^1$: 9.8, $Ra^2/Rb^2$: —, $Ra^3/Rb^3$: 9.7, $Ra^4/Rb^4$: 9.9
$Rc^1/Rd^1$: 8.8, $Rc^2/Rd^2$: —, $Rc^3/Rd^3$: 8.8, $Rc^4/Rd^4$: 9.3

Example 9 Sensitivity: 2.7

$Ra^1/Rb^1$: 1.7, $Ra^2/Rb^2$: 2.8, $Ra^3/Rb^3$: 2.9, $Ra^4/Rb^4$: 2.7
$Rc^1/Rd^1$: 6.5, $Rc^2/Rd^2$: 3.3, $Rc^3/Rd^3$: 6.5, $Rc^4/Rd^4$: 6.4

Example 10 Sensitivity: 5.9

$Ra^1/Rb^1$: 1.3, $Ra^2/Rb^2$: 1.4, $Ra^3/Rb^3$: 1.9, $Ra^4/Rb^4$: 1.6
$Rc^1/Rd^1$: 1.8, $Rc^2/Rd^2$: 1.5, $Rc^3/Rd^3$: 1.8, $Rc^4/Rd^4$: 1.7

Example 11 Sensitivity: 7.3

$Ra^1/Rb^1$: 5.0, $Ra^2/Rb^2$: 4.5, $Ra^3/Rb^3$: 7.1, $Ra^4/Rb^4$: 8.1
$Rc^1/Rd^1$: 8.1, $Rc^2/Rd^2$: 7.1, $Rc^3/Rd^3$: 8.1, $Rc^4/Rd^4$: 6.1

Example 12 Sensitivity: 7.7

$Ra^1/Rb^1$: 6.0, $Ra^2/Rb^2$: 5.8, $Ra^3/Rb^3$: 6.8, $Ra^4/Rb^4$: 6.3
$Rc^1/Rd^1$: 9.0, $Rc^2/Rd^2$: 9.0, $Rc^3/Rd^3$: 9.8, $Rc^4/Rd^4$: 9.7

Com. Ex. 1 Sensitivity: 1

$Ra^1/Rb^1$: 15, $Ra^2/Rb^2$: 11, $Ra^3/Rb^3$: 19, $Ra^4/Rb^4$: 18
$Rc^1/Rd^1$: 20, $Rc^2/Rd^2$: 26, $Rc^3/Rd^3$: 17, $Rc^4/Rd^4$: 29

Com. Ex. 2 Sensitivity: 0.06

$Ra^1/Rb^1$: 97, $Ra^2/Rb^2$: 60, $Ra^3/Rb^3$: 78, $Ra^4/Rb^4$: 88
$Rc^1/Rd^1$: 150, $Rc^2/Rd^2$: 130, $Rc^3/Rd^3$: 270, $Rc^4/Rd^4$: 180

Com. Ex. 3 Sensitivity: 0.88

$Ra^1/Rb^1$: 11, $Ra^2/Rb^2$: 11, $Ra^3/Rb^3$: 13, $Ra^4/Rb^4$: 15
$Rc^1/Rd^1$: 15, $Rc^2/Rd^2$: 11, $Rc^3/Rd^3$: 22, $Rc^4/Rd^4$: 19

Com. Ex. 4 Sensitivity: 0.08

$Ra^1/Rb^1$: 700, $Ra^2/Rb^2$: —, $Ra^3/Rb^3$: 950, $Ra^4/Rb^4$: 810
$Rc^1/Rd^1$: 800, $Rc^2/Rd^2$: —, $Rc^3/Rd^3$: 300, $Rc^4/Rd^4$: 780

Com. Ex. 5 Sensitivity: 0.04

$Ra^1/Rb^1$: 45, $Ra^2/Rb^2$: 37, $Ra^3/Rb^3$: 21, $Ra^4/Rb^4$: 40
$Rc^1/Rd^1$: 71, $Rc^2/Rd^2$: 68, $Rc^3/Rd^3$: 89, $Rc^4/Rd^4$: 88

Com. Ex. 6 Sensitivity: 0.43

$Ra^1/Rb^1$: 31, $Ra^2/Rb^2$: 16, $Ra^3/Rb^3$: 35, $Ra^4/Rb^4$: 22
$Rc^1/Rd^1$: 30, $Rc^2/Rd^2$: 15, $Rc^3/Rd^3$: 22, $Rc^4/Rd^4$: 21

Com. Ex. 7 Sensitivity: 0.80

$Ra^1/Rb^1$: 21, $Ra^2/Rb^2$: 13, $Ra^3/Rb^3$: 25, $Ra^4/Rb^4$: 20
$Rc^1/Rd^1$: 25, $Rc^2/Rd^2$: 29, $Rc^3/Rd^3$: 23, $Rc^4/Rd^4$: 20

What is claimed is:

1. A method for preparing a radiation image storage panel comprising a substrate and a phosphor film of a stimulable CsBr:Eu phosphor, said method comprising vaporizing one or more vaporization sources comprising a mother component and one or more vaporization sources comprising an europium element such that the vaporization of the mother component sources is controlled independent of the vaporization of the europium element sources, to form the phosphor film on the substrate.

2. The method of claim 1, wherein the europium element sources comprise europium compounds comprising a divalent europium compound of 70 mol.o or more, based on the total amount of an europium compounds in the sources.

3. The method of claim 2, wherein the europium compounds are expressed by EuBx, in which x satisfies the condition of $2.0 \leq x \leq 2.3$.

4. The method of claim 3, wherein the europium compound is heated to 100–800° C. prior to the vaporization.

* * * * *